(12) United States Patent
Dhanapal et al.

(10) Patent No.: US 11,224,089 B2
(45) Date of Patent: Jan. 11, 2022

(54) MEASUREMENT PROCEDURE FOR UNLICENSED BAND OPERATIONS

(71) Applicant: Apple Inc., Cupertino, CA (US)

(72) Inventors: Muthukumaran Dhanapal, Dublin, CA (US); Li Su, San Jose, CA (US); Beibei Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 42 days.

(21) Appl. No.: 16/677,204

(22) Filed: Nov. 7, 2019

(65) Prior Publication Data

US 2020/0146098 A1 May 7, 2020

Related U.S. Application Data

(60) Provisional application No. 62/756,956, filed on Nov. 7, 2018.

(51) Int. Cl.
*H04W 76/28* (2018.01)
*H04W 16/14* (2009.01)
*H04W 72/12* (2009.01)
*H04W 74/08* (2009.01)
*H04B 17/309* (2015.01)
*H04W 88/06* (2009.01)

(52) U.S. Cl.
CPC ......... *H04W 76/28* (2018.02); *H04B 17/309* (2015.01); *H04W 16/14* (2013.01); *H04W 72/1205* (2013.01); *H04W 74/0816* (2013.01); *H04W 88/06* (2013.01)

(58) Field of Classification Search
CPC ... H04W 76/28; H04W 74/086; H04W 72/10; H04W 72/04; H04W 72/02; H04W 72/1205; H04W 16/14; H04W 52/0225; H04W 52/0251; H04W 52/0261; H04W 74/0816; H04W 88/06; H04B 17/309
USPC .................................................. 370/329–330
See application file for complete search history.

(56) References Cited

U.S. PATENT DOCUMENTS

| 2012/0076059 | A1* | 3/2012 | Wu | H04W 24/10 370/311 |
| 2014/0349646 | A1* | 11/2014 | Su | H04W 76/28 455/436 |
| 2015/0189574 | A1* | 7/2015 | Ng | H04W 24/08 370/252 |
| 2016/0242231 | A1* | 8/2016 | Vajapeyam | H04W 76/28 |

(Continued)

*Primary Examiner* — Candal Elpenord
(74) *Attorney, Agent, or Firm* — Fay Kaplun & Marcin, LLP

(57) ABSTRACT

A user equipment (UE) is configured to connect to a primary cell serving a primary component carrier (PCC) in the licensed spectrum and a secondary cell serving a secondary component carrier (SCC) in an unlicensed spectrum. The UE is configured with a Connected Discontinuous Reception (C-DRX) functionality including an onDuration. The UE determines a first duration based on an amount of time between when a first operation related to an exchange of data over the SCC is to be performed and when the exchange of data over the SCC is likely to occur, determines whether the exchange of data over the SCC is likely to occur during the onDuration based on the first duration and when the exchange of data is unlikely to occur during the onDuration, delays when the first operation is to be performed to cause the exchange of data over the SCC to occur during the onDuration.

20 Claims, 7 Drawing Sheets

(56) References Cited

U.S. PATENT DOCUMENTS

| | | | | |
|---|---|---|---|---|
| 2017/0026948 A1* | 1/2017 | Yang | ............... | H04W 72/0406 |
| 2018/0351611 A1* | 12/2018 | Nagaraja | ........... | H04W 56/0065 |
| 2019/0021052 A1* | 1/2019 | Kadiri | ................. | H04W 24/10 |
| 2019/0215895 A1* | 7/2019 | Huang | ................. | H04W 24/10 |
| 2019/0215897 A1* | 7/2019 | Babaei | ................. | H04W 76/28 |
| 2019/0320491 A1* | 10/2019 | Shukair | ............ | H04W 52/0258 |

* cited by examiner

MEASUREMENT PROCEDURE FOR UNLICENSED BAND OPERATIONS

PRIORITY INFORMATION/INCORPORATION BY REFERENCE

This application claims priority to U.S. Provisional Application 62/756,956 entitled "Measurement Procedure for Unlicensed Band Operations," filed on Nov. 7, 2018, the entirety of which is incorporated herein by reference.

BACKGROUND

A user equipment (UE) may be configured to establish a connection to at least one of a plurality of different networks or types of networks. During the connection, the UE may be configured with a schedule that includes a set of active processing time periods and a set of available sleep time periods. For example, the UE may be configured with a connected discontinuous reception (C-DRX) cycle that includes onDurations during which the UE (e.g., a baseband processor) is configured to be in an active processing mode. During the portions of the C-DRX cycle where an onDuration is not scheduled, the UE has an opportunity to enter a sleep mode of inactivity and conserve power.

The UE may also be configured with carrier aggregation (CA) functionality to exchange data with the network. Certain types of CA utilize the unlicensed spectrum to provide a portion of the total bandwidth. The UE may be configured with both a C-DRX cycle and CA in the unlicensed spectrum simultaneously. The C-DRX cycle and CA in the unlicensed spectrum are independent processes. Thus, the UE may be configured to perform communications over the unlicensed spectrum without taking into consideration whether an onDuration of the C-DRX cycle is scheduled. This may result in instances during the C-DRX cycle where the UE has an opportunity to enter a sleep mode of inactivity and conserve power but instead, the UE is configured to be in an active mode of data exchange processing to perform communications over the unlicensed spectrum. This increases the overall active processing time of the UE and consequently, the power consumption of the UE.

SUMMARY

Some exemplary embodiments are directed to a method performed by a user equipment (UE) connected to a primary cell of a network, the UE and the network configured with a Connected Discontinuous Reception (C-DRX) functionality, the C-DRX functionality including a cycle with at least one onDuration, the UE further configured with carrier aggregation (CA) in an unlicensed spectrum, CA in the unlicensed spectrum including a primary component carrier (PCC) served by the primary cell on a frequency band in the licensed spectrum and a secondary component carrier (SCC) served by a secondary cell on a frequency band in an unlicensed spectrum. The method includes determining a first duration, wherein the first duration is based on an amount of time between when a first operation related to an exchange of data over the SCC is to be performed and when the exchange of data over the SCC is likely to occur, determining whether the exchange of data over the SCC is likely to occur during the at least one onDuration based on the first duration and when it is determined that the exchange of data is unlikely to occur during the at least one onDuration, delaying when the first operation is to be performed to cause the exchange of data over the SCC to occur during the at least one onDuration.

In other exemplary embodiments, a user equipment (UE) having a transceiver and a processor is described. The transceiver is configured to connect to a primary cell of a network and a secondary cell of the network, wherein the UE and the network are configured with a Connected Discontinuous Reception (C-DRX) functionality, the C-DRX functionality including a cycle with at least one onDuration, the UE further configured with carrier aggregation (CA) in an unlicensed spectrum, CA in the unlicensed spectrum including a primary component carrier (PCC) served by the primary cell on a frequency band in the licensed spectrum and a secondary component carrier (SCC) served by the secondary cell on a frequency band in an unlicensed spectrum. The processor is configured to determine a first duration, wherein the first duration is based on an amount of time between when a first operation related to an exchange of data over the SCC is to be performed and when the exchange of data over the SCC is likely to occur, determine whether the exchange of data over the SCC is likely to occur during the at least one onDuration based on the first duration and when it is determined that the exchange of data is unlikely to occur during the at least one onDuration, delaying when the first operation is to be performed to cause the exchange of data over the SCC to occur during the at least one onDuration.

In still further exemplary embodiments, a method performed by a user equipment (US) is described. The UE is connected to a primary cell of a network, the UE and the network configured with a Connected Discontinuous Reception (C-DRX) functionality, the C-DRX functionality including a cycle with at least one onDuration, the UE further configured with carrier aggregation (CA) in an unlicensed spectrum, CA in the unlicensed spectrum including a primary component carrier (PCC) served by the primary cell on a frequency band in the licensed spectrum and a secondary component carrier (SCC) served by a secondary cell on a frequency band in an unlicensed spectrum. The method includes determining whether a battery power of the UE is below a first battery power threshold and when the battery power of the UE is below the first battery power threshold, performing measurements corresponding to a neighbor cell operating in the unlicensed spectrum at a first rate when the at least one onDuration is scheduled and performing the measurements corresponding to the neighbor cell at a second rate during a portion of the cycle where the at least one onDuration is not scheduled.

In other exemplary embodiments, a user equipment (UE) having a transceiver and a processor is described. The transceiver is configured to connect to a primary cell of a network and connect to a secondary cell of the network, the UE and the network configured with a Connected Discontinuous Reception (C-DRX) functionality, the C-DRX functionality including a cycle with at least one onDuration, the UE further configured with carrier aggregation (CA) in an unlicensed spectrum, CA in the unlicensed spectrum including a primary component carrier (PCC) served by the primary cell on a frequency band in the licensed spectrum and a secondary component carrier (SCC) served by the secondary cell on a frequency band in an unlicensed spectrum. The processor is configured to determine whether a battery power of the UE is below a first battery power threshold and when the battery power of the UE is below the first battery power threshold, performing measurements corresponding to a neighbor cell operating in the unlicensed spectrum at a first rate when the at least one onDuration is scheduled and performing the measurements corresponding to the neighbor cell at a second rate during a portion of the cycle where the at least one onDuration is not scheduled.

DETAILED DESCRIPTION

Figure 1:
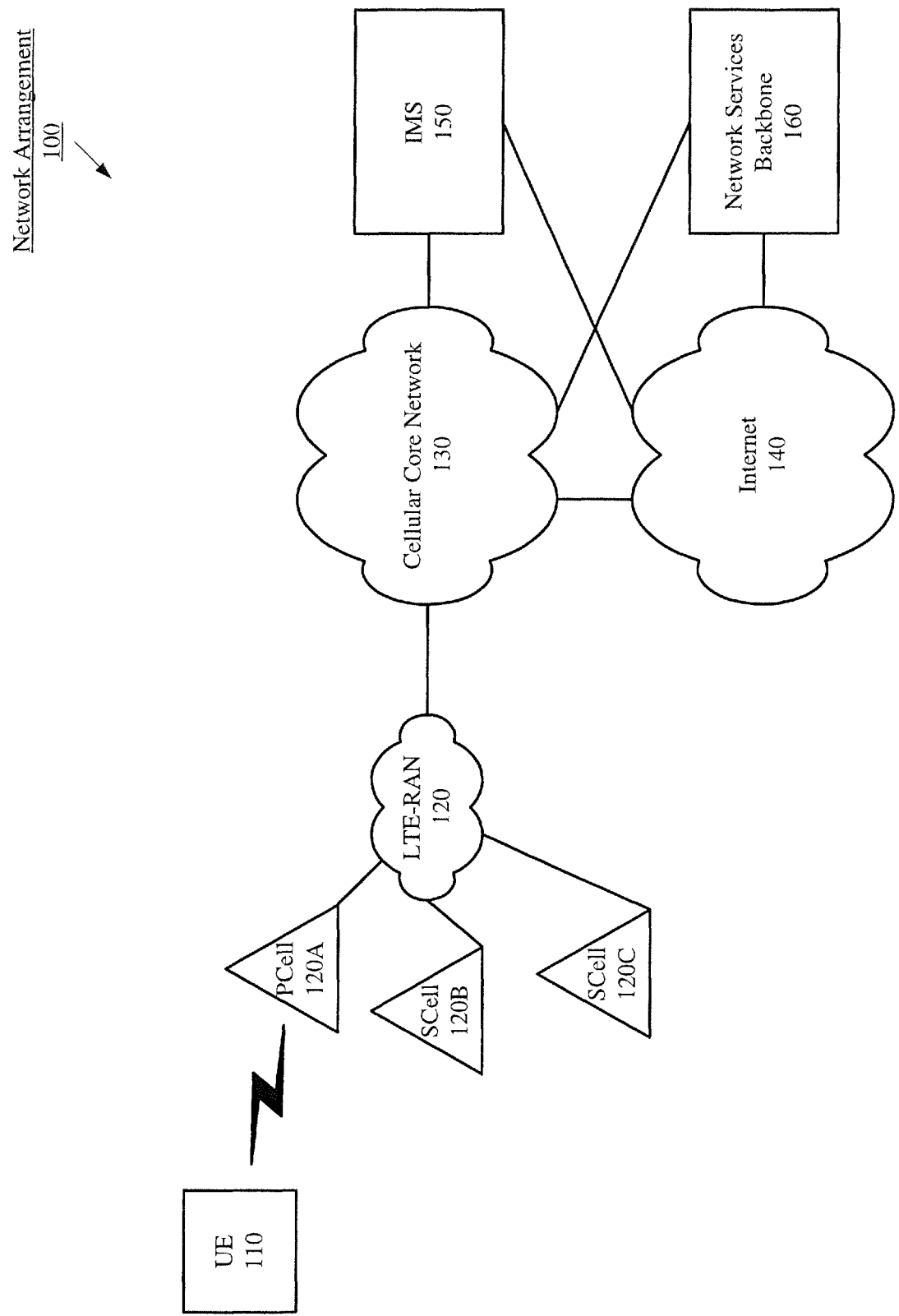
FIG. 1 shows an exemplary network arrangement according to various exemplary embodiments described herein.

The exemplary embodiments may be further understood with reference to the following description and the related appended drawings, wherein like elements are provided with the same reference numerals. The exemplary embodiments are related to a device, system and method for power optimization related to signaling performed by a user equipment (UE) configured with carrier aggregation (CA) in the unlicensed spectrum. For example, the exemplary embodiments may relate to aligning communications that occur over the unlicensed spectrum with instances where the UE is already scheduled to be in an active mode of data exchange processing.

The exemplary embodiments are described with regard to a UE. However, the use of a UE is merely for illustrative purposes. The exemplary embodiments may be utilized with any electronic component that may establish a connection with a network and configured with the hardware, software, and/or firmware to exchange information and data with the network. Therefore, the UE as described herein is used to represent any electronic component.

Further, the exemplary embodiments are described with regard to the cellular network being a Long Term Evolution (LTE) network with Licensed Assisted Access (LAA) functionality. A person of ordinary skill in the art would understand that LAA is a subset of CA that utilizes the unlicensed spectrum (e.g. 5 GHz band) to provide a portion of the total bandwidth between the UE and the LTE network. For example, the UE may camp on a first cell and establish a connection with the LTE network via the first cell. The UE and the first cell may communicate over the licensed spectrum. To increase the bandwidth between the UE and the network, the UE may also be configured to communicate with a second cell. The UE and the second cell may communicate over the unlicensed spectrum. Thus, the UE may communicate with the network via the first cell over the licensed spectrum and the second cell over the unlicensed spectrum. This configuration of a first cell and a second cell is merely exemplary, LAA functionality may be achieved with a variety of different configurations of cells. Further, any reference to an LTE network with LAA functionality is provided for illustrative purposes, the exemplary embodiments may apply to any type of network that implements CA utilizing the unlicensed spectrum. For example, it is contemplated that the standards for 5G New Radio (5G NR) will include a manner of using unlicensed spectrum for certain communications. The exemplary embodiments may also be implemented in a 5G NR network that includes the network characteristics as described herein.

The unlicensed spectrum is a shared transmission medium where a plurality of different devices utilizing a plurality of different communication protocols may utilize the unlicensed spectrum for communications. Accordingly, access to the unlicensed spectrum for LAA purposes may implicate various regulations and/or standards. For instance, Listen-Before-Talk (LBT) may be implemented in accordance with these regulations and/or standards to access the unlicensed spectrum for communications. LBT may relate to determining whether channels in the unlicensed spectrum are occupied by other signals prior to performing a transmission over the unlicensed spectrum. For example, a transmitting device (e.g. UE or cell) may perform clear channel assessment (CCA) to sense whether channels of the unlicensed spectrum that may be used for the transmission are busy. If the channels are busy, the transmitting device may continue to perform the CCA until it is determined that a channel is clear. Alternatively, if the channels are busy, the transmitting device may delay the transmission by a fixed or dynamic duration until it is likely that a channel of the unlicensed spectrum is clear. Once it is determined that a channel is clear, the transmitting device may perform the transmission over the unlicensed spectrum. However, reference to LBT is merely provided for illustrative purposes, different regulations or standards may refer to similar mechanisms or procedures by different names.

When connected to the LTE network, the UE may utilize a predetermined manner of receiving control channel information over the licensed spectrum. For example, a discontinuous reception (DRX) mechanism, such as a connected DRX (C-DRX) cycle may be utilized. The C-DRX cycle may include instances where an active mode of data exchange processing is scheduled and instances where a sleep mode of inactivity is scheduled. Throughout this description, the portion of the C-DRX cycle where the UE is scheduled to be in an active mode of data exchange processing may be referred to as an onDuration. During the C-DRX cycle, when an onDuration is not scheduled the UE may have an opportunity to utilize the sleep mode of inactivity and conserve power. Throughout this description, this portion of the C-DRX cycle may be referred to as an offDuration. When in an active mode of data exchange processing, the UE may perform operations that enable the UE to receive data transmitted to the UE such as but not limited to, control channel information, an uplink grant, a downlink grant, reference signals, synchronization signals, payload data, etc. For example, during an onDuration the UE may tune its transceiver to the downlink control channel to detect transmissions from the network. Thus, the control channel information may be scheduled to be received during onDurations because the UE is configured to be in an active mode of data exchange processing. However, an active mode of data exchange processing is not limited to operations that enable the UE to receive data. The UE may also be configured to perform other operations such as but not limited to, performing measurements of network/radio conditions, transmitting (e.g., requests, measurement reports, uplink data etc.) and processing related to exchanging data with the network.

The C-DRX cycle may include a predetermined duration (N) such as 10 milliseconds (ms), 40 ms, 80 ms, 160 ms, 320 ms, 640 ms, 1,280 ms, 2,560 ms, 5,120 ms etc. For example, at a time 0, a first onDuration may be scheduled during which the UE may utilize the active mode of data exchange processing for communications over the licensed spectrum. Upon the conclusion of the first onDuration and until time N, a first offDuration may be scheduled during which the UE has an opportunity to utilize the sleep mode of inactivity and conserve power. Upon the conclusion of the first offDuration, a second onDuration may be scheduled. This pattern may continue a predetermined number of times or until a predetermined condition occurs. The C-DRX cycle being configured in ms units is merely for illustrative purposes, the exemplary embodiments may utilize a C-DRX cycle that is based on a number of subframes or any other suitable unit of time.

A person of ordinary skill in the art will understand that an active mode of processing for the reception of data and/or control channel information transmitted to the UE may include operations such as the UE powering on its receiver and tuning the receiver to select channels to listen for transmissions to the UE. Measurements may be performed on the data and/or control channel information transmitted to the UE. It will be further understood, that reference to a sleep mode of inactivity, etc. may include operations such as the UE powering down its receiver and not listening for signals transmitted to the UE. Reference to the sleep mode of inactivity does not necessarily mean putting the processor, the transmitter, and the receiver of the UE to sleep, in hibernation, or being deactivated. For example, the processor (e.g., baseband and/or application) may continue to execute other applications or processes. The sleep mode relates to conserving power by discontinuing a continuous processing functionality relating to operations that enable the UE to receive data that may be transmitted to the UE and transmit data to the network. The active mode of processing and the sleep mode of inactivity may also include other operations and the turning on/off of the receiver should be understood to only be exemplary of operations that may be performed in these modes.

Throughout this description, the control channel information that is transmitted to the UE may be generally referred to as control channel information or may also refer to the specific type of information that is transmitted, e.g., a reference signal, a synchronization signal, etc. The payload data that is transmitted to the UE may be referred to generally as data or the specific type of payload data. In addition, when referring generally to any downlink information (control or data channel) or any uplink information the term data may also be used.

When connected to the LTE network, the UE may be configured with both a C-DRX cycle and LAA functionality simultaneously. The C-DRX cycle and LAA functionality are independent processes. For example, the UE may be configured to communicate with the LTE network via a first cell over the licensed spectrum and a second cell over the unlicensed spectrum. The C-DRX cycle relates to the communications with the first cell over the licensed spectrum. Conventionally, communications with the second cell over the unlicensed spectrum occur without taking into consideration whether an onDuration or an offDuration of the C-DRX cycle is scheduled. Accordingly, during conventional operations, there may be instances where the UE may enter an active mode of data exchange processing for LAA purposes when an offDuration is scheduled. In one example, the UE may be triggered to transmit over the unlicensed spectrum when an offDuration is scheduled. In another example, the UE may be configured to tune its transceiver and listen for communications over the unlicensed spectrum when an offDuration is scheduled. Thus, LAA functionality may cause the UE to enter an active mode of data exchange processing when an onDuration is not scheduled. This increases the overall active processing time of the UE and consequently, increases power consumption.

Any reference to a UE connected to an LTE network and configured with both a C-DRX cycle and LAA functionality is merely provided for illustrative purposes. Those skilled in the art will understand that the exemplary embodiments may apply to other network arrangements and configurations. For example, a 5G network may utilize a cycle similar to the C-DRX cycle and CA in the unlicensed spectrum similar to LAA. Thus, the exemplary embodiments may also apply to UEs that connect to 5G networks or any other type of network implementing similar functionality.

During operation, the UE and the network may exchange information for the purposes of radio resource management (RRM). RRM may relate to how the network configures the radio frequency resources and the network infrastructure. For example, the UE may be configured to detect signals, perform measurements and report the measurements to the network. The network may utilize these measurements to determine how the network will allocate the use of the spectrum, manage interference, ensure connection quality, etc. For LAA purposes, cells that may communicate over the unlicensed spectrum may transmit discovery reference signals (DRS). The DRS may include control channel information that the UE may detect and measure. The resulting measurement data may be utilized for RRM of the unlicensed spectrum.

The DRS may be transmitted over the unlicensed spectrum periodically for a predetermined duration, which may be referred to as a DRS measurement timing configuration (DMTC) occasion. When configured with DMTC occasions the UE may enter an active mode of processing to perform measurements related to the DRS. For example, a DMTC occasion may occur for a predetermined duration periodically every 40 ms, 80 ms, 160 ms, etc. A DMTC cycle being configured in ms units is merely for illustrative purposes, the exemplary embodiments may utilize a measurement schedule and DMTC occasions that are based on a number of subframes or any other suitable unit of time.

During a DMTC occasion, the UE may detect and measure DRS transmitted from both a serving cell in the unlicensed spectrum and a neighbor cell operating in the unlicensed spectrum. For example, prior to the reception of payload data from a serving cell over the unlicensed spectrum, the UE may be configured to provide the network with measurement data that is based on the DRS transmitted by the serving cell. In response to the measurement data, the network may provide the payload data to the UE over the unlicensed spectrum. In another example, the UE may be configured to provide the network with measurement data that is based on the DRS transmitted by neighbor cells over the unlicensed spectrum upon the occurrence of a predetermined condition (e.g., measurement data corresponding to a neighbor cell satisfying a threshold, a predetermined number of measurements, in response to a request, etc.). The measurement data corresponding to the neighbor cells may be utilized to enable communication between the UE and the neighbor cell. The UE may be configured to provide this measurement data to network over either the licensed spectrum or the unlicensed spectrum.

As mentioned above, under conventional systems, the C-DRX cycle and LAA functionality are independent processes. Thus, conventionally, the UE may not consider whether an onDuration or an offDuration is scheduled when performing operations for LAA related measurements. For example, the UE may enter an active mode of data exchange processing to detect and measure DRS of the serving cell when an offDuration of the C-DRX cycle is scheduled. The UE may then transmit the measurement data to the network which may cause the serving cell to transmit payload data to the UE over the unlicensed spectrum when an offDuration is scheduled. In another example, the predetermined condition that may trigger the UE to send measurement data corresponding to neighbor cells operating in the unlicensed spectrum may occur during an offDuration. Accordingly, the UE may be configured to communicate with a cell over the unlicensed spectrum during an offDuration based on the measurement data. By performing LAA related operations during a scheduled offDuration the UE is failing to take advantage of the power saving benefits provided by the C-DRX cycle.

The exemplary embodiments may relate to a UE that is configured to identify when LAA communications are likely to occur during an offDuration of the C-DRX cycle and alter the operation of the UE to align LAA communications with onDurations of the C-DRX cycle. Throughout this description, operations that are intended to align LAA communications with an onDuration of the C-DRX cycle may be referred to as LAA power saving operations. Some exemplary embodiments may relate to scheduling the transmission of payload data to the network over the unlicensed spectrum so that the transmission over the unlicensed spectrum is likely to occur during an onDuration of the C-DRX cycle. Other exemplary embodiments may relate to the UE providing measurement data related to the reception of payload data over the unlicensed spectrum at an instance that is likely to cause the reception of the payload data during an onDuration of the C-DRX cycle. Further exemplary embodiments may relate to reducing the rate in which neighbor cells operating in the unlicensed spectrum are measured during a scheduled offDuration. This may allow the UE to reduce the amount of time the UE is configured to be in an active mode of data exchange processing during an offDuration and may decrease the likelihood of the UE being configured to communicate with a cell over the unlicensed spectrum during an offDuration.

FIG. 1 shows an exemplary network arrangement 100 according to the exemplary embodiments. The exemplary network arrangement 100 includes a UT 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to connect to and communicate with one or more networks. The exemplary embodiments will be described with regard to the network being an LTE radio access network (LTE-RAN 120) that has LAA functionality. However, the use of an LTE-RAN 120 is merely exemplary, the exemplary embodiments may apply to any network that may utilize CA in the unlicensed spectrum. For instance, the UE 110 may communicate with a 5G New Radio (NR) radio access network or any network that may communicate with the UE 110 over the unlicensed spectrum. Therefore, the UE 110 may have an LTE chipset to communicate with the LTE-RAN 120.

The LTE-RAN 120 may be a portion of cellular networks that may be deployed by cellular providers (e.g., Verizon, AT&T, Sprint, T-Mobile, etc.). The LTE-RAN 120 may include, for example, base stations (Node Bs, eNodeBs, HeNBs, eNBS, gNBs, gNodeBs, macrocells, microcells, small cells, picocells, femtocells, etc.) that are configured to send and receive traffic from UEs that are equipped with the appropriate cellular chip set.

The UE 110 may connect to the LTE-RAN 120 via a primary cell (e.g., PCell 120A). Those skilled in the art will understand that the term primary cell is typically associated with the CA functionality currently being used. Thus, upon first connecting, the PCell 120A may not be assigned the primary role until CA functionality is configured. In addition, any association procedure may be performed for the UE 110 to connect to the LTE-RAN 120 via the PCell 120A. For example, as discussed above, the LTE-RAN 120 may be associated with a particular cellular provider where the UE 110 and/or the user thereof has a contract and credential information (e.g., stored on a SIM card). Upon detecting the presence of the LTE-RAN 120, the UE 110 may transmit the corresponding credential information to associate with the LTE-RAN 120. For example, the UE 110 may associate with a specific access point (e.g. PCell 120A). As mentioned above, the use of the LTE-RAN 120 is for illustrative purposes and any type of network that utilizes the unlicensed spectrum to exchange data with the UE 110 may be used.

The PCell 120A may control the mechanism used in exchanging data, particularly how data is transmitted to and received by the UE 110. When the UE 110 is CA capable, CA functionality enables the PCell 120A to combine bandwidths with at least one further base station to exchange data with the UE 110. The PCell 120A may be any type of LTE base station that communicates with the UE 110 in the licensed spectrum. Thus, with CA the PCell may provide a first portion of a total bandwidth for data to be exchanged while the at least one further base station may provide a second portion of the total bandwidth.

The network arrangement 100 may utilize LAA. Those skilled in the art would understand that License Assisted Access (LAA) is a type of CA where the at least one further base station (e.g. SCell 120B) operates in the unlicensed spectrum. For example, the PCell 120A may provide a first component carrier of a first bandwidth representing a primary component carrier (PCC) operating on a first frequency band in the licensed spectrum while the SCell 120B may provide a second component carrier of second bandwidth representing the secondary component carrier (SCC) operating on a second frequency band in the unlicensed spectrum. Accordingly, PCell 120A provides a first bandwidth in the licensed band and SCell 120B provides a second bandwidth in the unlicensed band to provide the total bandwidth for the UE 110. Reference to being configured with a single SCell 120B is merely exemplary and LAA functionality typically uses at least one SCell that operates in the unlicensed spectrum. Thus, the network arrangement 100 has a minimum of a single SCell operating in the unlicensed spectrum (e.g. SCell 120B) and may include a plurality of further SCells (not pictured) operating in either the licensed or unlicensed bands. Additionally, LAA functionality may be performed in both the uplink and the downlink. Thus, the UE 110 may communicate with SCell 120B in the unlicensed spectrum in both the uplink and downlink.

The SCell 120B may be an eNB modified to operate in the unlicensed spectrum, a small cell, a femtocell, a picocell, a microcell etc. Thus, the SCell 120B may be any type of base station that may communicate with the UE 110 in the unlicensed spectrum. Utilizing LAA, the SCell 120B may communicate over the 5 GHz band (e.g. Band 46) in the unlicensed spectrum. A single base station may include PCell 120A and SCell 120B. That is, a single base station may have a first connection to the UE 110 and provide a first portion of the total bandwidth to the UE 110 in the licensed band. Further, the single base station may have a second connection to the UE 110 and provide the second portion of the total bandwidth to the UE 110 in the unlicensed spectrum, e.g., a single base station may have multiple cells.

A base station that provides the UE 110 with bandwidth over the unlicensed spectrum (e.g. SCell 120B) may be referred to as an LAA serving cell. Further, a base station that may utilize the unlicensed spectrum but is not currently providing bandwidth to the UE 110 may be referred to as an LAA neighbor cell (e.g. SCell 120C). The use of a single LAA neighbor cell (e.g. SCell 120C) is merely exemplary, a network arrangement may include any number of LAA neighbor cells.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
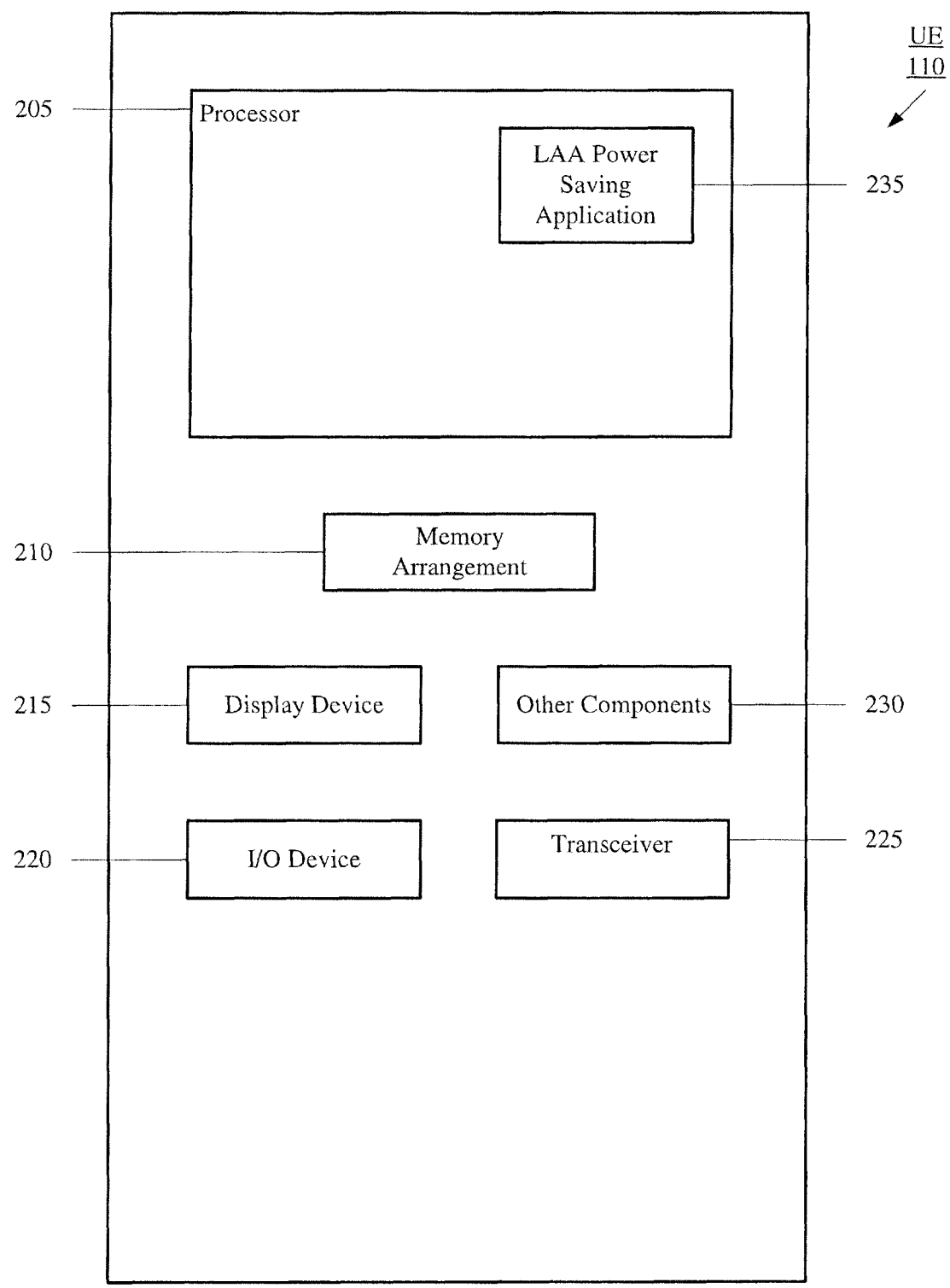
FIG. 2 shows an exemplary UE according to various exemplary embodiments described herein.

FIG. 2 shows a UE 110 according to various exemplary embodiments. The UE 100 may be configured with CA in the unlicensed spectrum to exchange data with the LTE-RAN 120. The UE 110 may represent any electronic device that is configured to perform wireless functionalities, examples of which were provided above. In another example, the UE 110 may be a stationary device such as a desktop terminal. The UE 110 may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the UE 110 to other electronic devices, etc.

The processor 205 may be configured to execute a plurality of applications. For example, the application may include a LAA power saving application 235 that may be configured to determine when communications over the unlicensed spectrum are likely to occur when an onDuration is not scheduled. Based on this determination, the LAA power saving application 235 may alter the operations of the UE 110 to align communications that are to occur over the unlicensed spectrum with an onDuration of the C-DRX cycle. For example, the LAA power saving application 235 may schedule uplink data over the unlicensed spectrum so it is likely to be transmitted during an onDuration. In another example, the LAA power saving application 235 may delay transmissions that trigger downlink data to be provided to the UE 110 until the downlink data is likely to be provided to the UE 110 during an onDuration. In a further example, LAA power saving application 235 may alter the rate in which neighbor cells operating in the unlicensed spectrum are measured during an offDuration to reduce both operations performed during an offDuration and the likelihood of triggering communications to occur over the unlicensed spectrum during the offDuration.

The above referenced application being an application (e.g., a program) executed by the processor 205 is only exemplary. The functionality associated with the applications may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The applications may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data for the UE 110. Specifically, the memory arrangement 210 may store data such as, but not limited to, voice transmissions, control channel information, measurements, a schedule related to a C-DRX cycle, a schedule related to DMTC occasions, etc. The display device 215 may be a hardware component configured to show data to a user while the I/O device 220 may be a hardware component that enables the user to enter inputs. The display device 215 and the I/O device 220 may be separate components or integrated together such as a touch-screen.

The transceiver 225 may be a hardware component configured to transmit and/or receive data. The transceiver 225 may enable communication with other electronic devices directly or indirectly through a network based upon an operating frequency of the network. The transceiver 225 may operate on a variety of different frequencies or channels (e.g., set of consecutive frequencies). Thus, an antenna (not shown) coupled with the transceiver 225 may enable the transceiver 225 to operate on the various frequencies. The transceiver 225 may be used to receive data from and transmit data to the LTE-RAN 120. In a first example, control channel information may be received from the PCell 120A via the transceiver 225 during an onDuration as indicated by the C-DRX cycle. In a second example, control information and/or data may be received from the SCell 120B operating in the unlicensed spectrum via the transceiver 105. These examples and configurations are merely provided for illustrative purposes and the transceiver 225 of the UE 110 may exchange data with the network in any appropriate manner.

As mentioned above, conventionally, the C-DRX cycle and CA in the unlicensed spectrum are independent processes. Thus, the UE 110 may be configured to be in an active mode of data exchange processing to perform communications over the unlicensed spectrum without taking into consideration whether an onDuration of the C-DRX cycle is scheduled. Thus, the UE 110 may fail to take advantage of an opportunity to enter a sleep mode of inactivity and conserve power.

Figure 3:
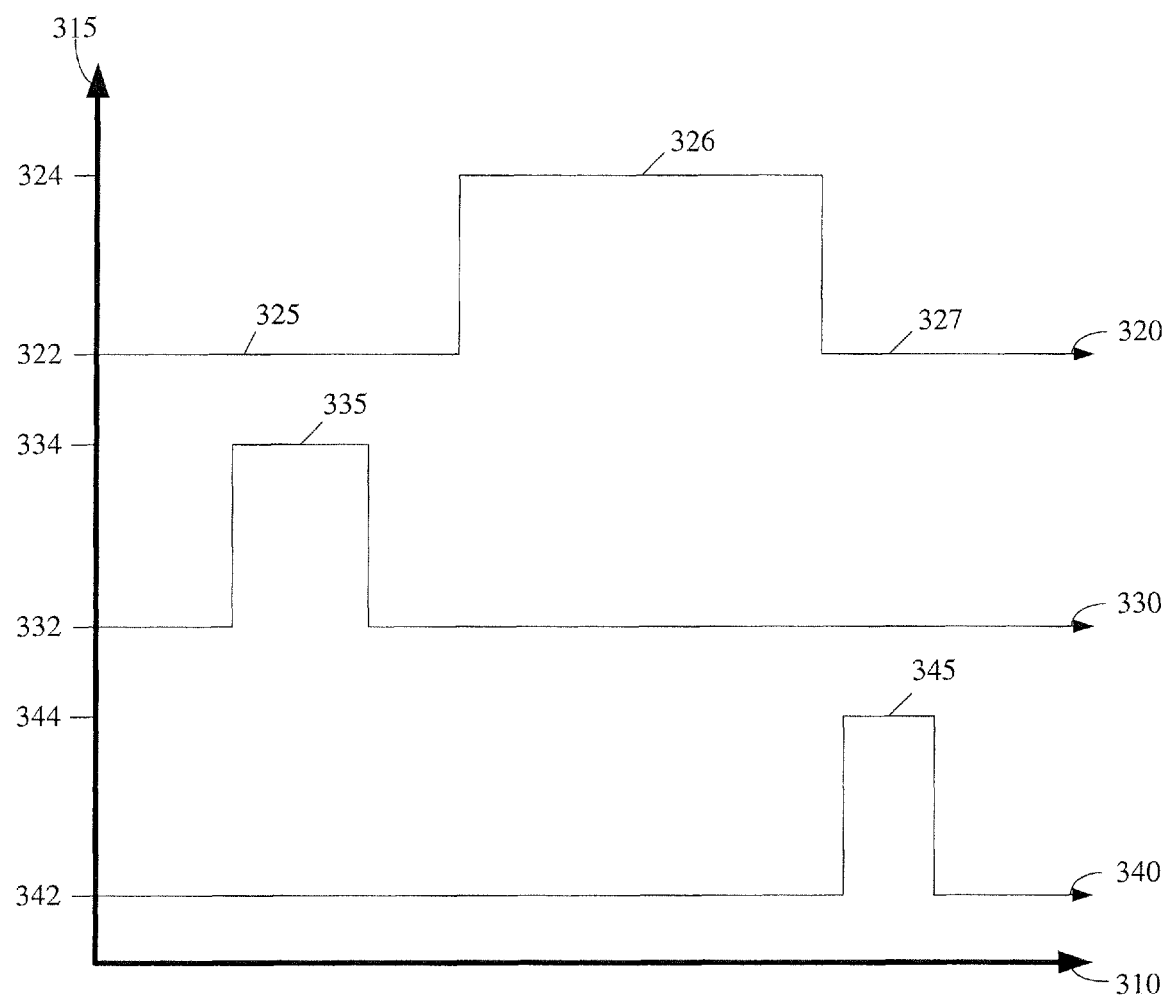
FIG. 3 shows a graph that provides an example of when an active mode of data exchange processing occurs for a UE configured with both a C-DRX cycle and LAA functionality according to various exemplary embodiments.

FIG. 3 shows a graph 300 that provides an example of when an active mode of data exchange processing occurs for a UE configured with both a C-DRX cycle and LAA functionality according to various exemplary embodiments. The graph 300 will be described with regard to the network arrangement 100 of FIG. 1 and the UE 110 of FIG. 2.

Consider an exemplary scenario where the UE 110 has established a connection to the LTE-RAN 120 via the PCell 120A. The UE 110 and the PCell 120A are configured to communicate over the licensed spectrum and a C-DRX cycle has been configured. The UE 110 is also configured to utilize LAA functionality. In this exemplary scenario this includes communicating in both the uplink and the downlink with the SCell 120B over the unlicensed spectrum.

The graph 300 includes three line graphs 320, 330 and 340 representing different operations performed by the UE 110 during this exemplary scenario. Line graph 320 represents a portion of a C-DRX cycle. The x-axis 310 represents time. The level of the line graph 320 on the y-axis 315 illustrates when the receiver of the UE 110 may be in an active mode of data exchange processing and when the receiver of the UE 110 may be in a sleep mode of inactivity in accordance with an onDuration of the C-DRX cycle. When the line graph 320 is plotted along the x-axis 310 at point 322 of the y-axis 315, an onDuration is not scheduled and the UE 110 has an opportunity to enter a sleep mode of inactivity and conserve power. When the line graph 320 is plotted along the x-axis 310 at point 324 of the y-axis 315, an onDuration is scheduled and the UE 110 may enter an active mode of data exchange processing by tuning its transceiver 225 to detect transmissions from the network via the PCell 120A. Thus, line graph 320 illustrates a first offDuration 325, an onDuration 326 and a second offDuration 327.

Line graph 330 represents when the UE 110 is in an active mode of data exchange processing to perform transmissions over the unlicensed spectrum. The level of the line graph 330 on the y-axis 315 illustrates when the UE 110 is in an active mode of data exchange processing to perform transmissions. When the line graph 330 is plotted along the x-axis 310 at point 332 of the y-axis 315 the UE 110 is not in an active mode of data exchange processing to perform a transmission. When the line graph 330 is plotted along the x-axis 310 at point 334 of the y-axis 315 the UE 110 is in an active mode of data exchange processing to perform a transmission.

In this exemplary scenario, the UE 110 is configured to perform conventional operations and has determined that payload data may be transmitted over the unlicensed spectrum. Accordingly, the UE 110 performs a signaling exchange (not pictured) with either the PCell 120A or the SCell 120B to indicate to the LTE-RAN 120 that payload data is to be transmitted to the SCell 120B over the unlicensed spectrum. The UE 110 does not consider if the transmission of the payload data over the unlicensed spectrum will be aligned with the onDuration 326. Based on the signaling exchange, the UE 110 is triggered to enter an active mode of processing to perform an LET procedure 335 to transmit the payload data to the SCell 120B over the unlicensed spectrum.

A comparison of the line graph 320 and the line graph 330 shows that the LBT procedure 335 occurs during the first offDuration 325. Accordingly, in this exemplary scenario, despite being provide an opportunity to enter a sleep mode of inactivity during the first offDuration 325, the UE 110 is in an active mode of data exchange processing to perform the LBT procedure 335.

Line graph 340 represents when the UE 110 is in an active mode of data exchange processing to receive payload data over the unlicensed spectrum. The level of the line graph 340 on the y-axis 315 illustrates when the UE 110 is in an active mode of data exchange processing to receive data over the unlicensed spectrum. When the line graph 340 is plotted along the x-axis 310 at point 342 of the y-axis 315 the UE 110 is not in an active mode of processing to receive data. When the line graph 340 is plotted along the x-axis 310 at point 344 of the y-axis 315 the UE 110 is in an active mode of data exchange processing to receive data.

In this exemplary scenario, the UE 110 has been configured to receive data over the unlicensed spectrum. This may be based on the UE 110 performing a signaling exchange (not pictured) with either the PCell 120A or the SCell 120B. The signaling exchange may include the UE 110 receiving a request to provide measurement data corresponding to the radio conditions between the UE 110 and the SCell 120B. In response to the request, the UE 110 may provide the measurement data to the network. When the LTE-RAN 120 receives the measurement data, the SCell 120B may be triggered to transmit the payload data over the unlicensed spectrum. In this exemplary scenario, the measurement data was provided to the LTE-RAN 120 during the onDuration 326. However, the measurement data was provided towards the end of the onDuration 326 and by the time the LTE-RAN 120 processed the measurement data, prepared the transmission and performed CCA as part of LBT the onDuration 326 has concluded and the subsequent downlink data is provided during the second offDuration 327. Accordingly, the UE 110 is configured to tune its transceiver 225 during 345 to listen for the downlink data from the SCell 120B over the unlicensed spectrum.

A comparison of the line graph 320 and the line graph 340 shows that 345 occurs during the second offDuration 327. Accordingly, despite being provide an opportunity to enter a sleep mode of inactivity during the second offDuration 327, the UE 110 is in an active mode of data exchange processing to receive downlink data over the unlicensed spectrum during 345.

This exemplary scenario demonstrates the power draining effects that conventional systems may suffer from by operating the C-DRX cycle and LAA functionality independently from one another. By performing LAA operations without taking into consideration whether an onDuration or an offDuration is occurring, the UE 110 failed to take full advantage of the power saving benefits of either the first offDuration 325 or the second onDuration 327. The conventional operations illustrated in FIG. 3 are merely provided for illustrative purposes. As mentioned above, the C-DRX cycle and LAA functionality are independent processes and thus, conventional uplink and downlink communications over the unlicensed spectrum may also occur during an onDuration or may partially overlap with an onDuration.

As mentioned above, the exemplary embodiments may relate to the UE 110 being configured to identify when LAA communications are likely to occur during an offDuration of the C-DRX cycle and alter the conventional operation of the UE to align LAA communications with onDurations of the C-DRX cycle.

Certain LAA communications may be triggered by predetermined conditions. Since the unlicensed spectrum is a shared medium, access to the unlicensed spectrum at any particular moment cannot be guaranteed. For example, LBT requires a transmission to be conditional on determining that the corresponding channel is clear. Accordingly, a schedule may not be utilized and instead, the reception of a particular signal or the occurrence of a predetermined condition may trigger one entity (UE or cell) to perform a particular operation and/or provide a particular type of data to the other entity. The UE 110 may monitor for these predetermined conditions to determine when an LAA communication is to occur and thus, whether an LAA communication is likely to occur during an offDuration or an onDuration of the C-DRX cycle.

In a first example, an uplink transmission of payload data over the unlicensed spectrum may be preceded by the UE 110 sending a request to the network indicating that the UE 110 has payload data to deliver over the unlicensed spectrum. In response to the request, the network may provide an uplink grant or a similar signal indicating that the network is prepared to receive the uplink payload data over the unlicensed spectrum from the UE 110. The request and the grant may be exchanged over the licensed spectrum and/or the unlicensed spectrum. In response to the grant, the UE 110 may perform an LBT procedure to transmit the payload data over the unlicensed spectrum. Accordingly, the UE 110 may monitor for characteristics of this type of signaling exchange to identify when an uplink communication over the unlicensed spectrum is likely to occur and thus, whether such a communication is likely to occur during an offDuration or an onDuration of the C-DRX cycle.

In another example, the network may be triggered to provide downlink payload data over the unlicensed spectrum based on receiving measurement data. This may include the UE 110 being requested to provide measurement data concerning the radio conditions of the downlink between the UE 110 and the LAA serving cell. Accordingly, the UE 110 may provide measurement data based on DRS transmitted by the LAA serving cell to the network. The measurement data may be collected in response to the request or may be previously collected by the UE 110. The exchange of the request and the measurement data may occur over the licensed spectrum and/or the unlicensed spectrum. When the network receives the measurement data, the LAA serving cell may be triggered to perform an LBT procedure to provide the payload data to the UE 110 over the unlicensed spectrum. Accordingly, the UE 110 may monitor for characteristics of this type of signaling exchange to identify when a downlink communication over the unlicensed spectrum is likely to occur and thus, whether such a communication is likely to occur during an offDuration or an onDuration of the C-DRX cycle.

In a further example, communications over the unlicensed spectrum between the UE 110 and a LAA neighbor cell (e.g., SCell 120C) may be triggered based on measurement data. Conventionally, the UE 110 may be configured with a schedule that indicates when the UE 110 is to tune its transceiver 225 and listen for DRS transmitted by LAA neighbor cells for RRM purposes. The UE 110 may be configured to provide measurement data corresponding to LAA neighbor cells for any one of a variety of different reasons including but not limited to, a predetermined number of measurements being performed, a predetermined threshold corresponding to a particular LAA neighbor cell being satisfied or a predetermined threshold corresponding to an LAA serving cell being satisfied. The measurement data corresponding to the LAA neighbor cells may cause the network to configure the UE 110 to communicate with a particular LAA neighbor cell over the unlicensed spectrum. Accordingly, LAA neighbor cell measurements may indicate to the UE 110 when communications over the unlicensed spectrum are likely to occur and thus, whether communications over the unlicensed spectrum may occur during an OffDuration or an onDuration of the C-DRX cycle.

As mentioned above, operations that are intended to align LAA communications with an onDuration of the C-DRX cycle may be referred to as LAA power saving operations. Aligning LAA communications and an onDuration of the C-DRX cycle may provide power saving benefits to UE 110. However, aligning LAA communications with an onDuration may cause LAA communications to experience latency. Accordingly, the exemplary embodiments may include determining whether to perform conventional LAA operations or LAA power saving operations.

Figure 4:
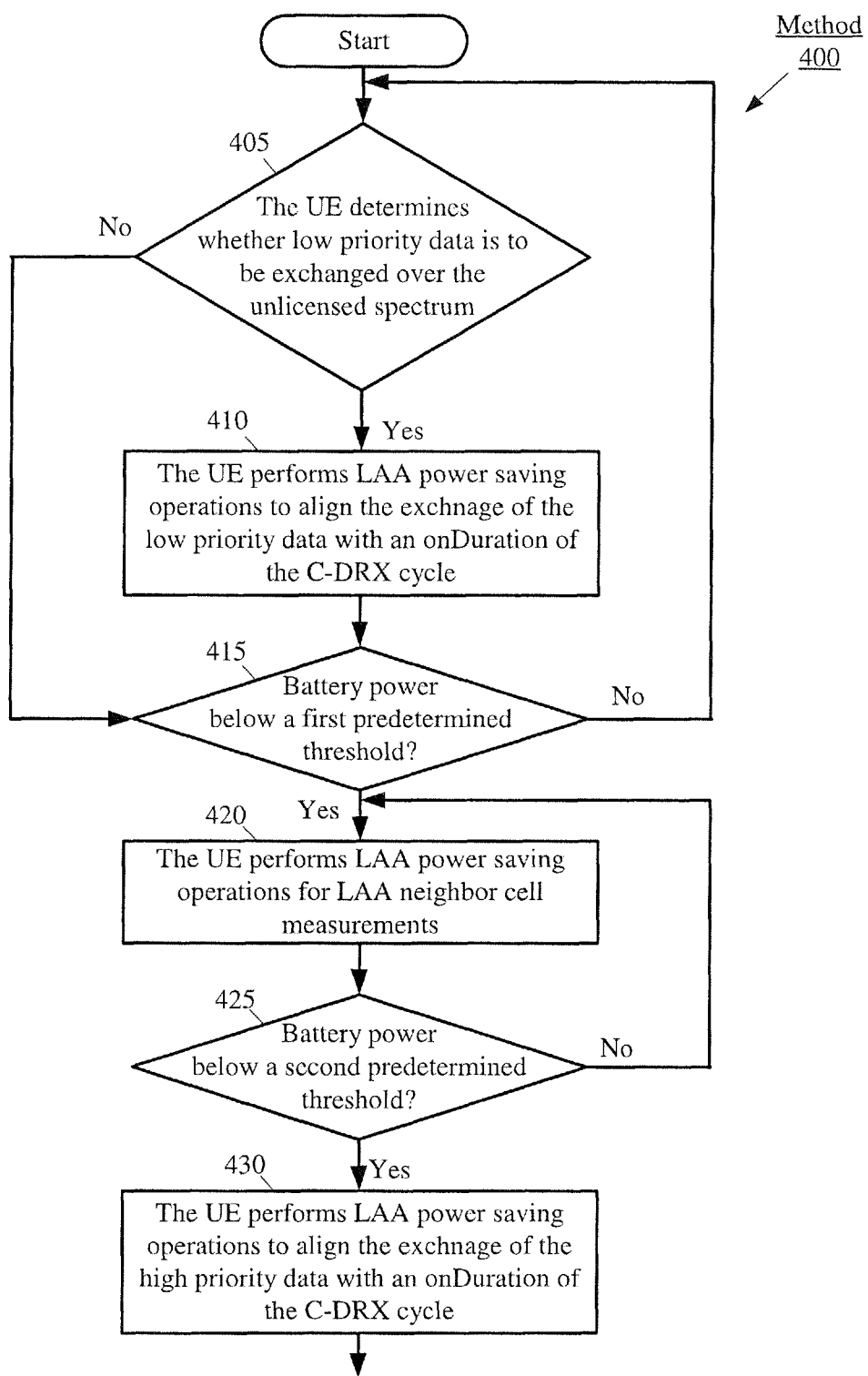
FIG. 4 shows an exemplary method for the UE to determine whether to perform conventional LAA operations or to perform LAA power saving operations according to various exemplary embodiments.

FIG. 4 shows an exemplary method 400 for the UE 110 to determine whether to perform conventional LAA operations or to perform LAA power saving operations according to various exemplary embodiments. The method 400 will be described with regard to the network arrangement 100 of FIG. 1 and the UE 110 of FIG. 2.

Consider an exemplary scenario where the UE 110 is connected to the LTE-RAN 120 via the PCell 120A. The communications between the UE 110 and the PCell 120A occur over the licensed spectrum and a C-DRX cycle is configured. The UE 110 is also configured to communicate with the LTE-RAN 120 via the SCell 120B over the unlicensed spectrum. The exemplary embodiments described below are merely provided to demonstrate an example of how the UE 110 may be configured to balance the power saving benefits provided by LAA power saving operations with any latency that LAA power saving operations may cause. Accordingly, the exemplary embodiments are not limited to these determinations, the UE 110 may implement LAA power saving operations at any time based on any appropriate factor.

In 405, the UE 110 determines whether low priority data is to be exchanged over the unlicensed spectrum. This may include either an uplink or downlink communication between the UE 110 and the LTE-RAN 120 over the unlicensed spectrum. The UE 110 may determine that either an uplink or downlink communication over the unlicensed spectrum is to occur based on various predetermined conditions including but not limited to, an amount of data in a baseband buffer, the reception of an uplink grant or similar indication that the network is prepared to receive data from the UE 110 over the unlicensed spectrum, a request to provide measurement data, a schedule, the transmission of measurement data corresponding to the unlicensed spectrum, measurement data satisfying a predetermined threshold, a predetermined number of measurements corresponding to a cell operating in the unlicensed spectrum, measurement data corresponding to any cell in the unlicensed spectrum satisfying a predetermined condition, or any other suitable indication that either an uplink or downlink communication is to occur over the unlicensed spectrum.

The UE 110 may designate the data that is to be exchanged over the unlicensed spectrum as low priority data or high priority data. Low priority data may refer to control information or payload data that does not possess a quality characteristic that correlates to latency. For example, uplink or downlink payload data corresponding to an email may be designated as low priority data because delaying the transmission or reception of an email by a negligible amount of time may not impact the user experience. In another example, downlink payload data corresponding to downloading an application may be designated as low priority data because delaying the completion of a download by a negligible amount of time may not impact the user experience. Throughout this description, any reference to a particular type of data being designated as low priority data is merely exemplary, any type of control information or payload data may be designated as low priority data for any appropriate reason.

High priority data may refer to control information or payload data that does possess a quality characteristic that correlates to latency. For example, uplink or downlink payload data corresponding to Voice over LTE (VoLTE) may be designated as high priority because a delay in the exchange of the VoLTE data may impact the user experience. In another example, uplink or downlink data corresponding to streaming media may be designated as high priority because a delay in streaming media data may impact the user experience. Throughout this description, any reference to a particular type of data being designated as high priority data is merely exemplary, any type of control information or payload data may be designated as high priority data for any appropriate reason.

In 405, if the UE 110 determines that low priority data is not to be exchanged, the method 400 continues to 415. Determining that low priority data is not to be exchanged may include determining that high priority data is to be exchanged or that no data is to be exchanged. If the UE determines that low priority data is to be exchanged the method 400 continues to 410.

In 410, the UE 110 performs LAA power saving operations to align the exchange of the low priority data with an onDuration of the C-DRX cycle. Aligning the exchange of low priority data with the onDuration is intended to limit the amount of time the UE 110 is in an active mode of data exchange processing during an offDuration. However, this may include performing signaling over either the licensed spectrum or the unlicensed spectrum during the offDuration. For example, aligning an uplink communication with the onDuration may include exchanging various signals including but not limited to, requests, reports, measurement data, grants, any combination thereof, etc. In another example, aligning a downlink communication with the onDuration may include exchanging various signals including but not limited to, requests, reports, measurement data, grants, any combination thereof, etc. Performing LAA operations to align the exchange of data with the onDuration of the C-DRX cycle will be described in detail below with regard to FIG. 5.

Since the data to be exchanged is low priority data, subjecting the communications to latency may not impact the user experience and thus, the UE 110 may be configured to perform LAA power saving operations for the exchange of low priority data at any time. However, the exemplary embodiments may utilize a predetermined threshold related to battery power to determine when to initiate LAA power saving operations for the exchange of low priority data.

In 415, the UE 110 determines whether the battery power is below a first predetermined threshold. The UE 110 may utilize a predetermined threshold related to battery power to determine when to perform LAA power saving operations. In this exemplary scenario, the UE 110 may set the first predetermined threshold to 20% of the total battery power and utilize this threshold to determine when to initiate LAA power saving operations for LAA neighbor cell measurements. However, this is merely exemplary, the UE 110 may set the first predetermined threshold to any value. If the UE 110 determines that the battery power is above the first predetermined threshold, the method 400 may return to 405 where the UE 110 determines whether low priority is to be exchanged over the unlicensed spectrum. If the UE 110 determines that the battery power is below the first predetermined threshold the method 400 continues to 420.

In 420, the UE performs LAA power saving operations for LAA neighbor cell measurements. This may include limiting the number of times the UE 110 tunes its transceiver 225 to detect and measure DRS transmitted by LAA neighbor cells during offDurations. By limiting these instances, the UE 110 may reduce the duration in which the UE 110 is in an active mode of data exchange processing during offDurations. This may also reduce the likelihood in which the UE 110 is configured to communicate with one of the LAA neighbor cells during offDurations. LAA power saving operations for LAA neighbor cell measurements will be described in detail below with regard to FIG. 7.

In 425, the UE 110 determines whether the battery power is below a second predetermined threshold. In this exemplary scenario, the UE 110 may set the second predetermined threshold to 10% of the total battery power and utilize this threshold to initiate LAA power saving operations for the exchange of high priority data. However, this is merely exemplary, the UE 110 may initiate LAA power saving operations for the exchange of high priority data based on a predetermined threshold set to any value or any other appropriate factor. Further, the use of multiple predetermined thresholds is merely exemplary, the UE 110 may utilize a single predetermined threshold to initiate power saving operations for an exchange of low priority data, an exchange of high priority data and LAA neighbor cell measurements. If the UE 110 determines that the battery power is above the second predetermined threshold, the method 400 may return to 420 where the UE 110 determines whether the battery power is below the second predetermined threshold and is configured to perform LAA power saving operations for the exchange of low priority operations and LAA neighbor cell measurements. If the UE 110 determines that the battery power is below the second predetermined threshold the method 400 continues to 430.

In 430, the UE 110 performs LAA power saving operations to align the exchange of high priority data with an onDuration of the C-DRX cycle. This is similar to aligning the exchange of low priority data with an onDuration as described above in 410. Aligning the exchange of data with the onDuration of the C-DRX cycle will be described in detail below with regard to FIG. 5.

Figure 5:
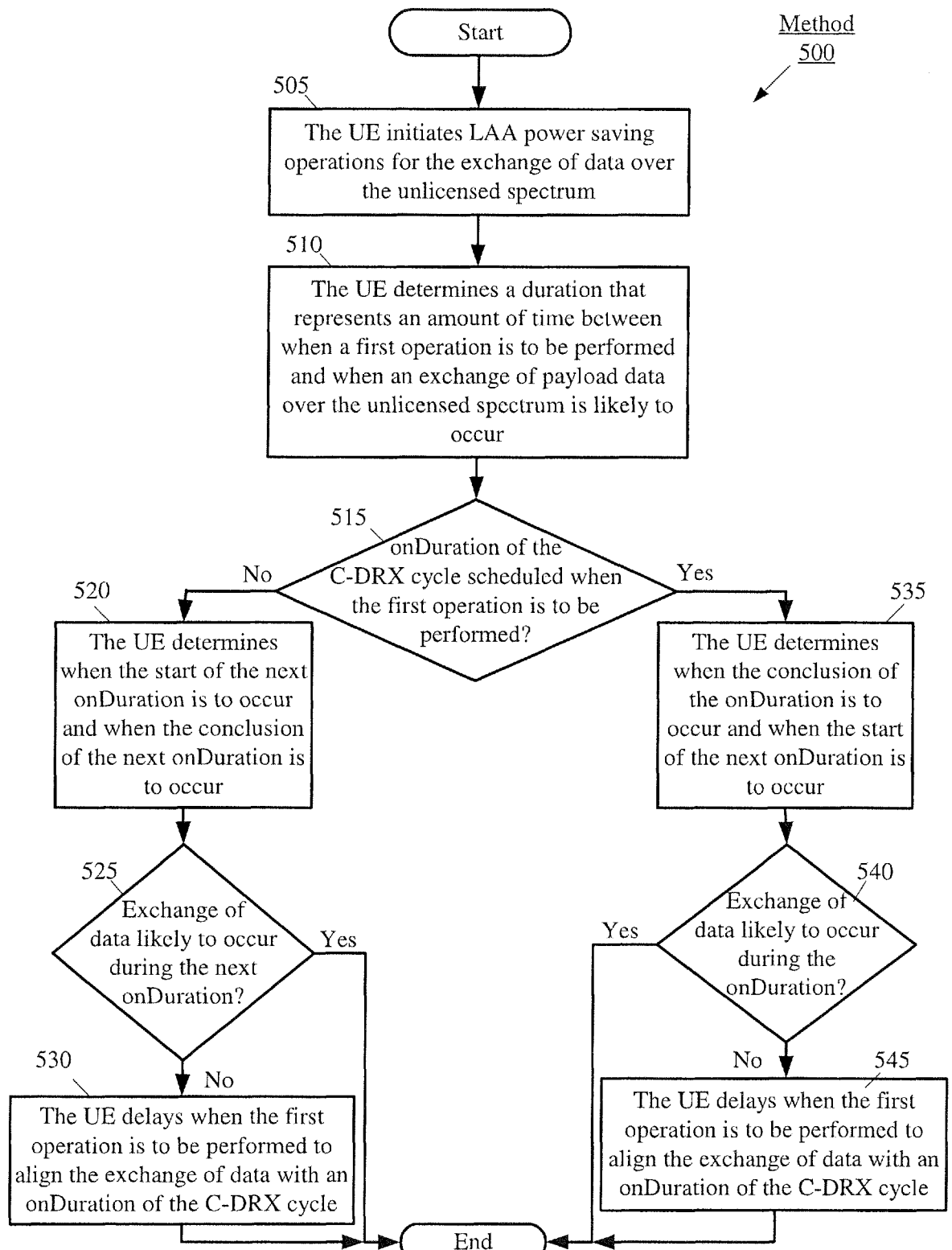
FIG. 5 shows an exemplary method for the UE to perform LAA power saving operations for uplink communications according to various exemplary embodiments.

FIG. 5 shows an exemplary method 500 for the UE 110 to perform LAA power saving operations for exchanging data according to various exemplary embodiments. The method 500 will be described with regard to the network arrangement 100 of FIG. 1, the UE 110 of FIG. 2 and method 400 of FIG. 4.

Consider an exemplary scenario where the UE 110 is connected to the LTE-RAN 120 via the PCell 120A. The communications between the UE 110 and the PCell 120A occur over the licensed spectrum and a C-DRX cycle is configured. The UE 110 is also configured to communicate with the LTE-RAN 120 via the SCell 120B over the unlicensed spectrum.

In 505, the UE 110 initiates LAA power saving operations for the exchange of data over the unlicensed spectrum. For example, as described above with regard to 410 and 430 of the method 400, the UE 110 may determine to initiate LAA power saving operations for the exchange of data based on any of a variety of different factors. These factors may include whether low priority data is to be exchanged as described in 410 or whether high priority data is to be exchanged as described in 430. However, regardless of whether low priority data or high priority data is to be exchanged, the process of aligning communications with an onDuration may be the same.

In 510, the UE 110 determines a duration that represents an amount of time between when a first operation is to be performed and when an exchange of payload data over the unlicensed spectrum is likely to occur. The first operation may represent any operation or signal included in a signaling exchange between the UE 110 the network that precedes the transmission of payload data to the network over the unlicensed spectrum or precedes the reception of payload data by the UE 110 over the unlicensed spectrum.

For example, the transmission of payload data to the network over the unlicensed spectrum may be preceded by collecting measurement data, a request transmitted by the UE 110 to perform the transmission of the payload data, the UE 110 providing measurement data corresponding to the radio conditions of the LAA serving cell (e.g., SCell 120B), a grant indicating the network is prepared to receive the uplink payload data, etc. In this exemplary scenario, when the exchange of data is a transmission performed by the UE 110, the first operation may be the request transmitted by the UE to provide the payload data to the network over the unlicensed spectrum. However, this is merely provided for illustrative purposes and the exemplary embodiments may utilize any operation that is configured to precede the transmission of payload data as the first operations.

In another example, the reception of payload data by the UE 110 over the unlicensed spectrum may be preceded by a request for the UE 110 to provide measurement data corresponding to the radio conditions of the LAA serving cell (e.g., SCell 120B) and collecting the measurement data. In this exemplary scenario, when the exchange of data is the reception of payload data by the UE 110, the first operation may be the request for the UE 110 to provide the measurement data. However, this is merely provided for illustrative purposes and the exemplary embodiments may utilize any operation that is configured to precede the reception of payload data as the first operations.

The duration that represents the amount of time between when the first operation is to be performed and when the data exchange is likely to occur may be determined based on any of a variety of different factors. For example, the UE 110 may consider which medium (e.g., licensed spectrum or unlicensed spectrum) the signaling exchange that precedes the transmission/reception of the payload data is to be utilized, the processing time that the network may utilize between the reception of the request and the transmission of the grant, the processing time that the network may utilize between the reception of the measurement data and the transmission of the payload data, the radio conditions of the unlicensed spectrum, measurement data, predetermined durations configured by the manufacturer or provider or any combination thereof.

The UE 110 and/or the network may also collect statistics corresponding to the turnaround time between the first operation and exchange of the payload data. These statistics may include but are not limited to, previous interactions between the UE 110 and the SCell 120B, similar interactions between other LIES and the SCell 120B, interactions between UEs and LAA serving cells under similar radio conditions, interactions between UEs and LAA serving cells with similar measurement data, the duration of LBT procedures for UEs experiencing similar radio conditions, the duration of LBT procedures for LAA serving cells with similar network loads, etc. The UE 110 and/or the network may manage a look up table based on these type of statistics and the UE 110 may reference the lookup table when determining the first duration. The factors mentioned above are merely provided for illustrative purposes, the UE 110 may determine the first duration based on any appropriate criteria.

In 515, the UE 110 determines whether an onDuration of the C-DRX cycle is scheduled when the first operation is to be performed. If an onDuration is not scheduled, the method 500 continues to 520.

In 520, the UE 110 determines when the start of the next onDuration is to occur and when the conclusion of the next onDuration is to occur.

In 525, the UE 110 determines whether the exchange of data is likely to be aligned with the next onDuration. This determination may be based on the duration determined in 510 that represents the amount of time between when the first operation is to be performed and when the data exchange is likely to occur, when the start of the next onDuration is to occur and when the conclusion of the next onDuration is to occur. For example, based on the duration determined in 510 the UE 110 may determine that the SCell 120B is likely to perform an LBT procedure at an instance that is likely to cause the UE 110 to receive the payload data over the unlicensed spectrum during the next onDuration. In another example, based on the duration determined in 510, the UE 110 may determine that the UE is likely to be triggered to perform an LBT procedure at an instance that is likely to cause the UE 110 to transmit that the payload data over the unlicensed spectrum during the next onDuration.

If the UE 110 determines that the exchange of data is not likely to occur during the next onDuration the method 500 continues to 530. This may include determining that the transmission of the payload data by the UE 110 is likely to be performed prior to the start of the next onDuration, the transmission of the payload data by the UE 110 is likely to occur after the conclusion of the next onDuration, the reception of the payload data by the UE 110 is likely to occur prior to the next on duration or that the reception of the payload data by the UE 110 is likely to occur after the conclusion of the next onDuration.

In 530, the UE 110 delays when the first operation is to be performed to align the exchange of data with an onDuration of the C-DRX cycle. For example, if the UE 110 determined that the duration determined in 510 would result in the transmission likely being performed prior to the next onDuration, the UE 110 may delay performing the first operation until an instance where the duration determined in 510 would result in the transmission likely being performed during the next onDuration. If the UE 110 determined that the duration determined in 510 would result in the transmission likely being performed after the conclusion of the next onDuration, the UE 110 may delay performing the first operation until an instance where the duration determined in 510 would result in the transmission likely being performed during an onDuration subsequent to the next onDuration.

In another example, if the UE 110 determined that the duration determined in 510 would result in the reception of payload data likely occurring prior to the next onDuration, the UE 110 may delay performing the first operation until an instance where the duration determined in 510 would result in the reception of the payload data likely occurring during the next onDuration. If the UE 110 determined that the duration determined in 510 would result in the reception likely occurring after the conclusion of the next onDuration, the UE 110 may delay performing the first operation until an instance where the duration determined in 510 would result in the reception of the payload data occurring during an onDuration subsequent to the next onDuration.

Returning to 525, if the UE 110 determines that the exchange of data is likely to be performed during the next onDuration the method 500 ends and the UE 110 does not delay performing the first operation. Since, the UE 110 has determined that the exchange of data is likely to occur during the next onDuration there is no need to alter the operations of the UE 110 because coincidentally, an onDuration of the C-DRX cycle and the exchange of data over the unlicensed spectrum are aligned. Thus, the exchange of data will likely not cause the UE 110 to forgo an opportunity to enter a sleep mode of inactivity and conserve during an offDuration.

Returning to 515, if the UE 110 determines that an onDuration is scheduled when the first operation is to be performed the method 500 continues to 535.

In 535, the UE 110 determines when the conclusion of the onDuration is to occur and when the start of the next onDuration is to occur.

In 540, the UE 110 determines whether the exchange of data is likely to occur during the onDuration. This may include determining that the transmission is likely to occur after the conclusion of the onDuration or that the reception of the payload data is likely to occur after the conclusion of the onDuration. If the UE 110 determines that the data exchange is likely to occur after the conclusion of the onDuration, the method 500 continues to 545.

In 545, the UE 110 delays when first operation is to be performed to align the exchange of data with an onDuration of the C-DRX cycle. This is similar to the operation performed in 530.

Returning to 540, if the UE 110 determines that the exchange of data is likely to be performed during the onDuration the method 500 ends and the UE 110 does not delay performing the first operation. Since, the UE 110 has determined that the exchange of data is likely to occur during the onDuration there is no need to alter the operations of the UE 110 because coincidentally, an onDuration of the C-DRX cycle and the exchange of data over the unlicensed spectrum are aligned. Thus, the exchange of data will likely not cause the UE 110 to forgo an opportunity to enter a sleep mode of inactivity and conserve during an offDuration.

Figure 6:
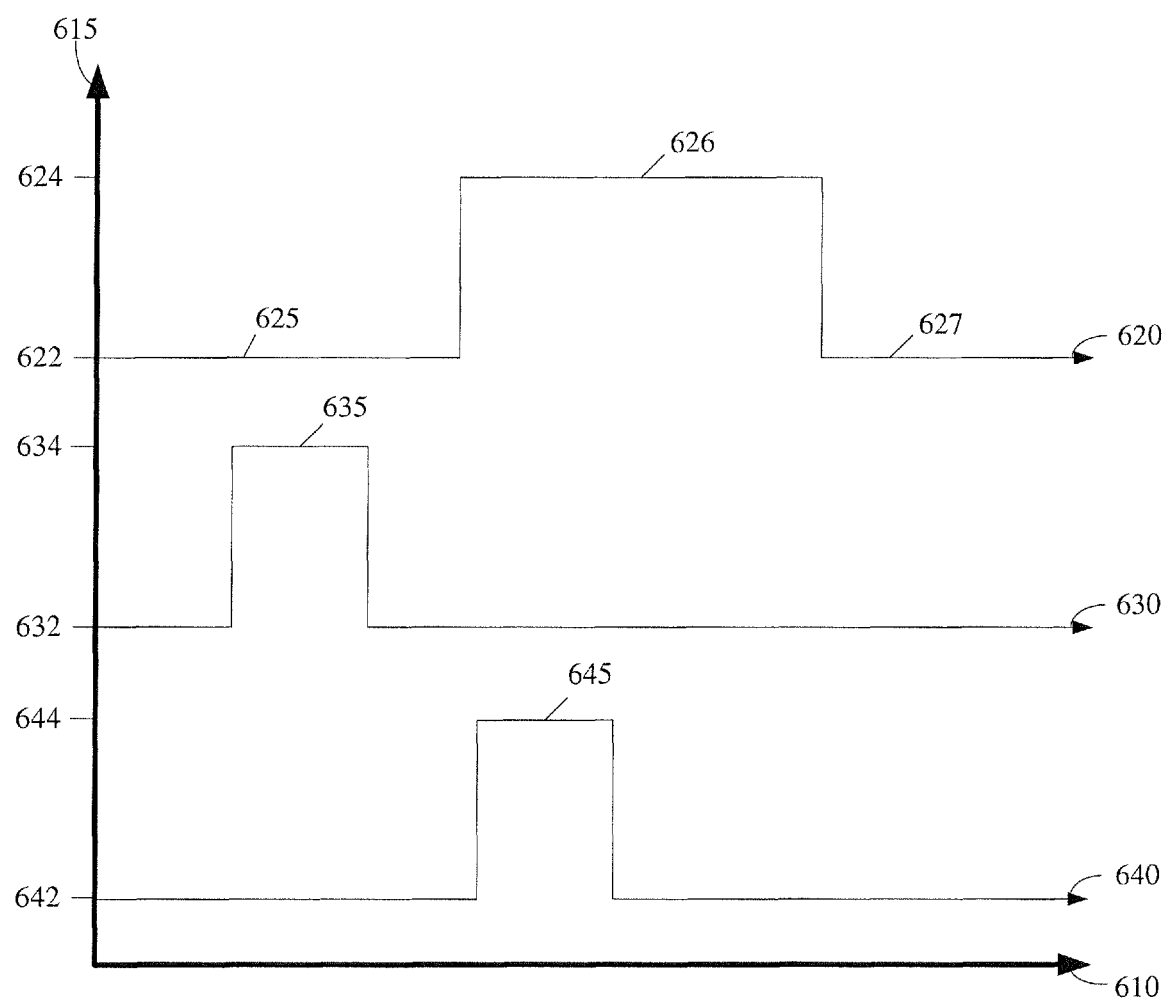
FIG. 6 shows a graph that provides an example of when an active mode of data exchange processing occurs for a UE performing LAA power saving operations for the exchange of data according to various exemplary embodiments.

FIG. 6 shows a graph 600 that provides an example of when an active mode of data exchange processing occurs for a UE performing LAA power saving operations for the exchange of data according to various exemplary embodiments. The graph 600 will be described with regard to the network arrangement 100 of FIG. 1, the UE 110 of FIG. 2 and the method 500 of FIG. 5.

Consider an exemplary scenario where the UE 110 has established a connection to the LTE-RAN 120 via the PCell 120A. The UE 110 and the PCell 120A are configured to communicate over the licensed spectrum and a C-DRX cycle has been configured. The UE 110 is also configured to utilize LAA functionality. In this exemplary scenario, the UE 110 is configured to perform LAA power saving operations and thus, the UE 110 aligns when the UE 110 is in an active mode of data exchange processing to perform the exchange of data with the SCell 120B over the unlicensed spectrum with an onDuration of the C-DRX cycle.

The graph 600 includes three line graphs 620, 630 and 640 representing different operations performed by the UE 110 during this exemplary scenario. Line graph 620 represents a portion of a C-DRX cycle. The x-axis 610 represents time. The level of the line graph 620 on the y-axis 615 illustrates when the UE 110 may be in an active mode of data exchange processing and when the UE 110 may be in a sleep mode of inactivity in accordance with an onDuration of the C-DRX cycle. When the line graph 620 is plotted along the x-axis 610 at point 622 of the y-axis 615, an onDuration is not scheduled and the UE 110 has an opportunity to enter a sleep mode of inactivity and conserve power. When the line graph 620 is plotted along the x-axis 610 at point 624 of the y-axis 615, an onDuration is scheduled and the UE 110 may enter an active mode of data exchange processing by tuning its transceiver 225 to detect transmissions from the network via the PCell 120A. Thus, line graph 620 illustrates a first offDuration 625, an onDuration 626 and a second offDuration 627.

Line graph 630 represents when the UE 110 may be in an active mode of data exchange processing to perform a data exchange over the unlicensed spectrum when the UE 110 is configured to perform conventional LAA operations. The level of the line graph 630 on the y-axis 615 illustrates when the UE 110 is in an active mode of data exchange processing. When the line graph 630 is plotted along the x-axis 610 at point 632 of the y-axis 615 the UE 110 is not in an active mode of data exchange processing. When the line graph 630 is plotted along the x-axis 610 at point 634 of the y-axis 615 the UE 110 is in an active mode of data exchange processing.

In this exemplary scenario, consider that the UE 110 is triggered to perform a transmission of payload data according to conventional LAA operations. As mentioned above, under conventional LAA operations, the UE 110 does not consider if the transmission of the payload data over the unlicensed spectrum will be aligned with the onDuration 626. Prior to the transmission of the payload data, the UE 110 and the network may perform a signaling exchange (not pictured) to prepare the network to receive the payload data over the unlicensed spectrum. This triggers the UE 110 to perform an LBT procedure 635 and provide the payload data to the SCell 120B over the unlicensed spectrum.

A comparison of the line graph 620 and the line graph 630 shows that the LBT procedure 635 occurs during the first offDuration 325. Accordingly, despite being provide an opportunity to enter a sleep mode of inactivity during the first offDuration 325, conventional LAA operations may cause the UE 110 to be in an active mode of data exchange processing to perform the LBT procedure 335.

Line graph 640 represents when the UE 110 may be in an active mode of data exchange processing to perform a data exchange over the unlicensed spectrum when the UE 110 is configured to perform LAA power saving operations. The level of the line graph 640 on the y-axis 615 illustrates when the UE 110 is in an active mode of data exchange processing to exchange. When the line graph 640 is plotted along the x-axis 610 at point 642 of the y-axis 615 the UE 110 is not in an active mode of data exchange processing. When the line graph 640 is plotted along the x-axis 610 at point 644 of the y-axis 615 the UE 110 is in an active mode of data exchange processing.

In this exemplary scenario, the UE 110 experiences the same circumstances that caused the line graph 630. However, instead of being configured to perform conventional LAA operations the UE 110 is configured to perform LAA power saving operations. Accordingly, as described above in the method 500, the UE 110 may alter when the UE 110 initiates the signaling exchange (not pictured) that is intended to prepare the network to receive the payload data over the unlicensed spectrum. This enables the UE 110 to align the LBT procedure 645 with the onDuration of the C-DRX cycle.

A comparison of the line graph 620 and the line graph 640 shows that the LBT procedure 645 occurs during the onDuration 326. Line graph 630 and line graph 640 represent a UE 110 subjected to the same circumstances. However, the line graph 640 represents a UE 110 configured with LAA power saving operations while line graph 630 represents a UE configured with conventional LAA power saving operations. A comparison of line graph 640 and line graph 630 demonstrates that under the same circumstances, LAA power saving operations may align when the UE 110 is in an active mode of data exchange processing for LAA purposes (e.g. the LBT procedure 645) and the onDuration 326 while conventional LAA operations do not align when the UE 110 is in an active mode of data exchange processing for LAA purpose (e.g., the LBT procedure 635) and the onDuration 326. Accordingly, unlike conventional LAA operations, LAA power saving operations enable the UE 110 to take advantage of an opportunity to enter a sleep mode of inactivity during the first offDuration 326 and conserve power.

As mentioned above, communications over the unlicensed spectrum between the UE 110 and a LAA neighbor cell (e.g., SCell 120C) may be triggered based on measurement data. Accordingly, when the UE 110 is configured to perform LAA power saving operations, the UE 110 may alter the performance of LAA neighbor cell measurement related operations.

Figure 7:
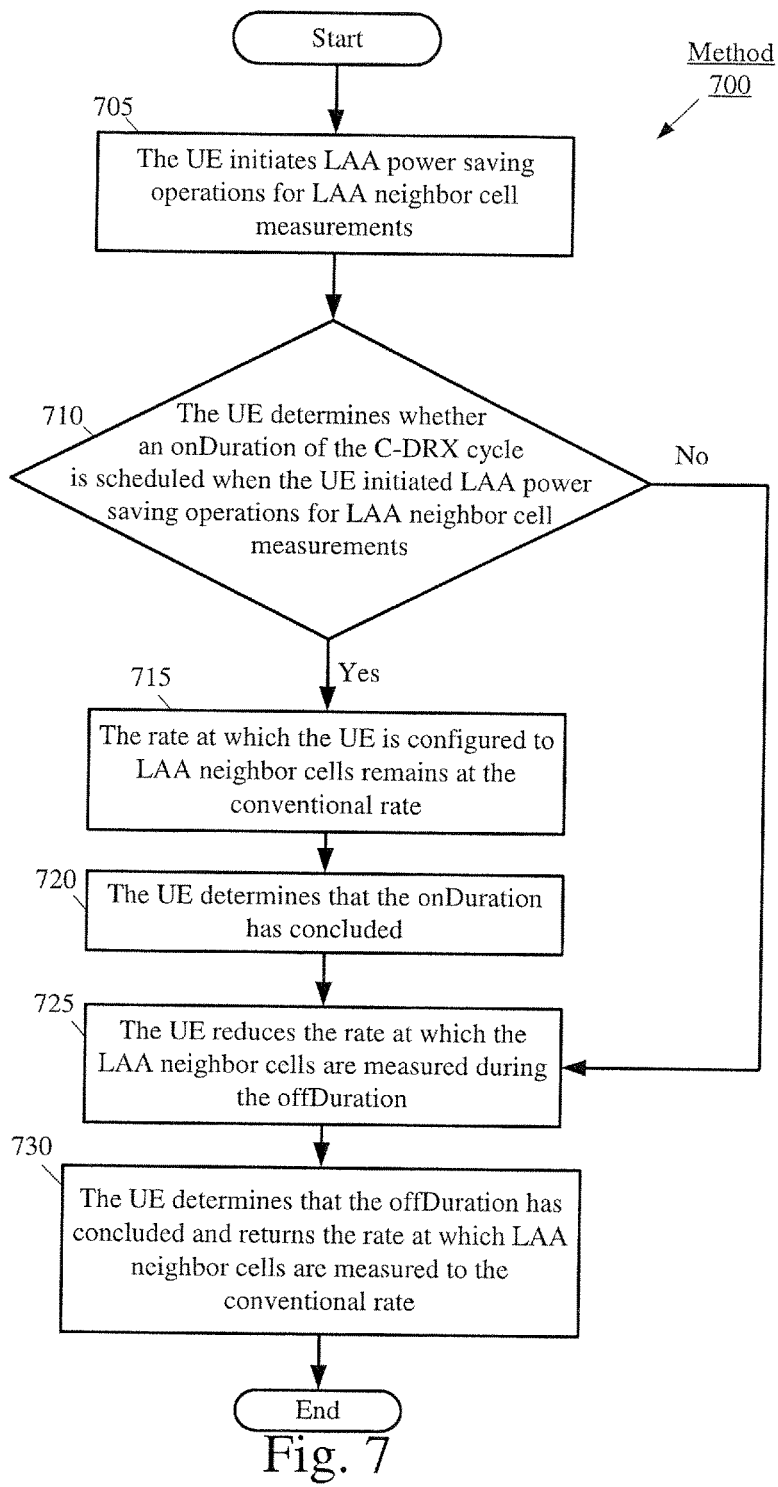
FIG. 7 shows an exemplary method 700 for the UE 110 to perform LAA power saving operations for LAA neighbor cell measurements according to various exemplary embodiments.

FIG. 7 shows an exemplary method 700 for the UE 110 to perform LAA power saving operations for LAA neighbor cell measurements according to various exemplary embodiments. The method 700 will be described with regard to the network arrangement 100 of FIG. 1, the UE 110 of FIG. 2 and method 400 of FIG. 4.

Consider an exemplary scenario where the UE 110 is connected to the LTE-RAN 120 via the PCell 120A. The communications between the UE 110 and the PCell 120A occur over the licensed spectrum and a C-DRX cycle is configured. The UE 110 is also configured to communicate with the LTE-RAN 120 via the SCell 120B over the unlicensed spectrum. Further, the UE 110 is configured with a schedule of DMTC occasions to perform LAA neighbor cell measurements of SCell 120C. The DMTC occasion is configured such that five DMTC occasions occur during offDurations and three DMTC occasions occur during onDurations. However, this is merely provided for illustrative purposes, LAA operations and the C-DRX cycle are configured independently from one another and thus, DMTC occasions may align with the C-DRX cycle in any manner.

In 705, the UE 110 initiates LAA power saving operations for LAA neighbor cell measurements. This determination is described above with regard to 415 of the method 400.

In 710, the UE 110 determines whether an onDuration of the C-DRX cycle is scheduled when the UE 110 initiated LAA power saving operations for LAA neighbor cell measurements. If an onDuration is scheduled the method 700 continues to 715. If an onDuration is not scheduled the method 700 continues to 725.

In 715, the rate at which the UE 110 is configured to measure LAA neighbor cells remains at the conventional rate. In this exemplary scenario, three DMTC occasions are scheduled to occur during onDurations and thus, the UE 110 will perform the measurements of the SCell 120C during the DMTC occasions as scheduled. Since the UE 110 is already in an active mode of data exchange processing in accordance with the C-DRX cycle, the UE 110 does not experience any additional power drain by performing the LAA neighbor cell measurements during the onDuration nor would the UE 110 experience any additional power drain if the UE 110 was configured to communicate with SCell 120C over the unlicensed spectrum during the onDuration.

In 720, the UE 110 determines that onDuration has concluded. This may indicate to the UE 110 that an offDuration is to occur.

In 725, the UE 110 reduces the rate at which LAA neighbor cells are measured during the offDuration. For example, the UE 110 may place the SCell 120C on a reduced performance list, this may indicate to the UE 110 that the UE 110 is to limit the instances in which the UE 110 tunes its transceiver 225 to perform measurements on DRS transmitted by the SCell 120C during DMTC occasions. In this exemplary scenario, the UE 110 may only measure DRS transmitted by the SCell 120C during a single DMTC occasion and the remaining four DMTC occasions scheduled during the offDuration may be ignored. By reducing the rate in which LAA neighbor cell measurements are performed during an offDuration the UE 110 is able to reduce the amount of time in which the UE 110 is in an active mode of data exchange processing during the offDuration. Further, since predetermined conditions related to LAA neighbor cell measurements may trigger communications between an LAA neighbor cell and the UE 110, reducing the number of measurements performed and the amount of measurement data collected corresponding to LAA neighbor cells during offDurations reduces the likelihood that the UE 110 would be configured to enter an active mode of data exchange processing to communicate with an LAA neighbor cell during an offDuration.

In 730, the UE 110 determines that the offDuration has concluded and returns the rate at which LAA neighbor cells are measured to the conventional rate. For example, the start of the onDuration may trigger the UE 110 to remove the SCell 120C from the reduced performance list. The process of transitioning between a state of measuring LAA neighbor cells at the conventional rate and a state of measuring LAA neighbor cells at the reduced rate may continue until the UE 110 terminates the performance of LAA power saving operations.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
at a user equipment (UE) connected to a primary cell of a network, the UE and the network configured with a Connected Discontinuous Reception (C-DRX) functionality, the C-DRX functionality including a cycle with at least one onDuration, the UE further configured with carrier aggregation (CA) in an unlicensed spectrum, CA in the unlicensed spectrum including a primary component carrier (PCC) served by the primary cell on a frequency band in the licensed spectrum and a secondary component carrier (SCC) served by a secondary cell (SCell) on a frequency band in an unlicensed spectrum:
determining a first duration, wherein the first duration is based on an amount of time between when a first operation related to an exchange of data over the SCC is to be performed and when the exchange of data over the SCC is to occur;
determining whether the exchange of data over the SCC is to occur during the at least one onDuration based on the first duration; and
when it is determined that the exchange of data is not to occur during the at least one onDuration, delaying when the first operation is to be performed to cause the exchange of data over the SCC to occur during the at least one onDuration.

2. The method of claim 1, wherein the exchange of data over the SCC comprises a transmission of payload data by the UE to the network.

3. The method of claim 2, wherein the transmission of payload data includes determining whether a channel is occupied based on a clear channel assessment (CCA).

4. The method of claim 1, wherein the first operation comprises a transmission of a scheduling request to the network over one of the PCC or the SCC.

5. The method of claim 1, wherein the exchange of data over the SCC comprises a transmission of payload data by the SCell to the UE.

6. The method of claim 5, wherein the first operation is a transmission of a measurement report corresponding to radio conditions of the unlicensed spectrum.

7. The method of claim 5, wherein the first operation comprises performing a measurement corresponding to radio conditions of the unlicensed spectrum.

8. The method of claim 7, wherein delaying when the first operation is to be performed is further preceded by at least one of determining whether the exchange of data includes high priority data or low priority data and determining whether a battery power is below a predetermined battery power percentage threshold.

9. A user equipment (UE), comprising:
a transceiver configured to connect to a primary cell of a network and a secondary cell (SCell) of the network, wherein the UE and the network are configured with a Connected Discontinuous Reception (C-DRX) functionality, the C-DRX functionality including a cycle with at least one onDuration, the UE further configured with carrier aggregation (CA) in an unlicensed spectrum, CA in the unlicensed spectrum including a primary component carrier (PCC) served by the primary cell on a frequency band in the licensed spectrum and a secondary component carrier (SCC) served by the SCell on a frequency band in an unlicensed spectrum; and
a processor configured to:
determine a first duration, wherein the first duration is based on an amount of time between when a first operation related to an exchange of data over the SCC is to be performed and when the exchange of data over the SCC is to occur;
determine whether the exchange of data over the SCC is to occur during the at least one onDuration based on the first duration; and
when it is determined that the exchange of data is not to occur during the at least one onDuration, delaying when the first operation is to be performed to cause the exchange of data over the SCC to occur during the at least one onDuration.

10. The UE of claim 9, wherein the exchange of data over the SCC comprises a transmission of payload data by the UE to the network, wherein the transmission of payload data includes determining whether a channel is occupied based on a clear channel assessment (CCA).

11. The UE of claim 9, wherein the first operation comprises a transmission of a scheduling request to the network over one of the PCC or the SCC.

12. The UE of claim 9, wherein the exchange of data over the SCC comprises a transmission of payload data by the SCell to the UE.

13. The UE of claim 12, wherein the first operation comprises one of a transmission of a measurement report corresponding to radio conditions of the unlicensed spectrum or performing a measurement corresponding to radio conditions of the unlicensed spectrum.

14. The UE of claim 9, wherein delaying when the first operation is to be performed is further preceded by at least one of determining whether the exchange of data includes high priority data or low priority data and determining whether a battery power is below a predetermined battery power percentage threshold.

15. A method, comprising:
at a user equipment (UE) connected to a primary cell of a network, the UE and the network configured with a Connected Discontinuous Reception (C-DRX) functionality, the C-DRX functionality including a cycle with at least one onDuration, the UE further configured with carrier aggregation (CA) in an unlicensed spectrum, CA in the unlicensed spectrum including a primary component carrier (PCC) served by the primary cell on a frequency band in the licensed spectrum and a secondary component carrier (SCC) served by a secondary cell (SCell) on a frequency band in an unlicensed spectrum:
determining whether a battery power of the UE is below a first battery power threshold; and
when the battery power of the UE is below the first battery power threshold, performing measurements corresponding to a neighbor cell operating in the unlicensed spectrum at a first rate when the at least one onDuration is scheduled and performing the measurements corresponding to the neighbor cell at a second rate during a portion of the cycle where the at least one onDuration is not scheduled.

16. The method of claim 15, wherein the first rate comprises more measurements than the second rate.

17. The method of claim 15, further comprising:
determining whether an exchange of data in the unlicensed spectrum includes high priority data or low priority data;
when the data is determined to be low priority data, delaying when an operation is to be performed to cause the exchange of data to occur during the at least one onDuration.

18. The method of claim 17, further comprising:
determining whether the battery power of the UE is below a second battery power threshold; and
when the battery power of the UE is below the second battery power threshold and the data is determined to be high priority data, delaying when the operation is to be performed to cause the exchange of data to occur during the at least one onDuration.

19. A user equipment (UE), comprising:
a transceiver configured to connect to a primary cell of a network and connect to a secondary cell (SCell) of the network, the UE and the network configured with a Connected Discontinuous Reception (C-DRX) functionality, the C-DRX functionality including a cycle with at least one onDuration, the UE further configured with carrier aggregation (CA) in an unlicensed spectrum, CA in the unlicensed spectrum including a primary component carrier (PCC) served by the primary cell on a frequency band in the licensed spectrum and a secondary component carrier (SCC) served by the SCell on a frequency band in an unlicensed spectrum; and
a processor configured to:
determine whether a battery power of the UE is below a first battery power threshold; and
when the battery power of the UE is below the first battery power threshold, performing measurements corresponding to a neighbor cell operating in the unlicensed spectrum at a first rate when the at least one onDuration is scheduled and performing the measurements corresponding to the neighbor cell at a second rate during a portion of the cycle where the at least one onDuration is not scheduled.

20. The UE of claim 19, wherein the processor is further configured to:
determine whether an exchange of data in the unlicensed spectrum includes high priority data or low priority data;
when the data is determined to be low priority data, delaying when an operation is to be performed to cause the exchange of data to occur during the at least one onDuration;
when the data is determined to be high priority data, determine whether the battery power of the UE is below a second battery power threshold; and
when the battery power of the UE is below the second battery power threshold and the data is determined to be high priority data, delaying when the operation is to be performed to cause the exchange of data to occur during the at least one onDuration.

* * * * *